(12) United States Patent
Salvato

(10) Patent No.: US 7,764,320 B1
(45) Date of Patent: Jul. 27, 2010

(54) PORTABLE IMAGING SYSTEM FOR MULTIMODE CAMERA WITH DIFFERENT FOCAL LENGTH LENS AND FIXED OR MOVEABLE IMAGE SENSORS

(75) Inventor: Dominick Salvato, North Salem, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 1889 days.

(21) Appl. No.: 10/307,786

(22) Filed: Dec. 2, 2002

(51) Int. Cl.
*H04N 5/225* (2006.01)
(52) U.S. Cl. .................................. 348/344; 348/376
(58) Field of Classification Search ............. 348/14.1, 348/218.1, 343–344, 373–376; 235/462.11, 235/462.13, 462.24, 462.41, 462.43; 455/575.4
See application file for complete search history.

(56) References Cited

U.S. PATENT DOCUMENTS

| | | | | |
|---|---|---|---|---|
| 5,041,859 A | * | 8/1991 | Ishiguro et al. | 396/123 |
| 5,748,339 A | * | 5/1998 | Suzuki et al. | 358/473 |
| 6,177,950 B1 | * | 1/2001 | Robb | 348/14.01 |
| 6,501,909 B1 | * | 12/2002 | Nishimura et al. | 396/74 |
| 6,532,035 B1 | * | 3/2003 | Saari et al. | 348/14.02 |
| 6,816,156 B2 | * | 11/2004 | Sukeno et al. | 345/207 |
| 6,898,301 B2 | * | 5/2005 | Iwanaga | 382/124 |
| 7,106,357 B2 | * | 9/2006 | Fukuda et al. | 348/14.02 |
| 2001/0043273 A1 | * | 11/2001 | Herrod et al. | 348/220 |
| 2003/0036365 A1 | * | 2/2003 | Kuroda | 455/90 |
| 2003/0234867 A1 | * | 12/2003 | Fujita et al. | 348/207.1 |
| 2004/0056956 A1 | * | 3/2004 | Gardiner et al. | 348/207.1 |

FOREIGN PATENT DOCUMENTS

| | | | |
|---|---|---|---|
| JP | 11-220684 | * | 8/1999 |
| JP | 2001-209545 | * | 8/2001 |

OTHER PUBLICATIONS

English Abstract of Japanese Patent Publication JP 2001-209545 published Aug. 3, 2001.*
English Abstract for Japanese Patent Publication 11-220684 to Shioura.*

* cited by examiner

*Primary Examiner*—Sinh Tran
*Assistant Examiner*—Daniel M Pasiewicz

(57) ABSTRACT

Systems and methods for a portable electronic device are provided. The portable electronic device includes a multi-mode camera system for providing a plurality of operation modes for the portable electronic device. The multimode camera system includes at least one image sensor and at least one lens. At least one of the image sensor(s) and the lens(es) is selectable and/or repositionable to provide a plurality of different focal lengths for the camera system.

16 Claims, 14 Drawing Sheets

PORTABLE IMAGING SYSTEM FOR MULTIMODE CAMERA WITH DIFFERENT FOCAL LENGTH LENS AND FIXED OR MOVEABLE IMAGE SENSORS

TECHNICAL FIELD

The present invention generally relates to portable electronic devices. In particular, the present invention relates to systems and methods for a multimode camera system for a portable electronic device

BACKGROUND OF THE INVENTION

Electronic devices, such as cameras and bar code scanners, employ a lens to focus an image onto an image sensor. Image sensors contain a grid of photosites that convert light to electrical charges. These charges can then be measured and converted into digital numbers that indicate how much light is reflected onto each photosite. Generally, an image is focused onto the image sensor through a camera or scanner lens. Varying amounts of light are reflected onto each photosite, which loosen electrons that are then captured and stored. The number of electrons loosened from any photosite is directly proportional to the amount of light hitting it. When the exposure is completed, the sensor contains different numbers of electrons accumulated onto each photosite. The image is read off the sensor by converting the stored electrons to a series of analog charges, which are then converted to digital values by an Analog-to-Digital (A/D) converter.

Accordingly, image sensors can be utilized for a plurality of tasks. However, employing image sensors for different tasks conventionally requires utilizing multiple devices, as such tasks require different optical characteristics (e.g., focal length).

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention provides systems and methods for a multimode camera system. The multimode camera system comprises a portable electronic device, which includes at least one image sensor or photosensitive device. Also included within the portable electronic device is a plurality of lenses. At least two of the plurality of lenses corresponds to at least two positions of the at least one image sensor. Alternatively, at least two of the plurality of lenses corresponds to at least two image sensors. Each of the plurality of lenses can have a focal length that is dependent on a shape and other optical characteristics of each lens. Accordingly, each lens provides for a different mode of operation for the portable electronic device. Such modes of operation can include image capture of bar codes, still pictures, video conferencing, facial recognition, iris recognition, and user assisted aligning for iris scanning.

To the accomplishment of the foregoing and related ends, the invention then, comprises the features hereinafter fully described and particularly pointed out in the claims. The following description and the annexed drawings set forth in detail certain illustrative aspects of the invention. These aspects are indicative, however, of but a few of the various ways in which the principles of the invention may be employed and the present invention is intended to include all such aspects and their equivalents. Other objects, advantages and novel features of the invention will become apparent from the following detailed description of the invention when considered in conjunction with the drawings.

DETAILED DESCRIPTION OF THE INVENTION

Figure 1:
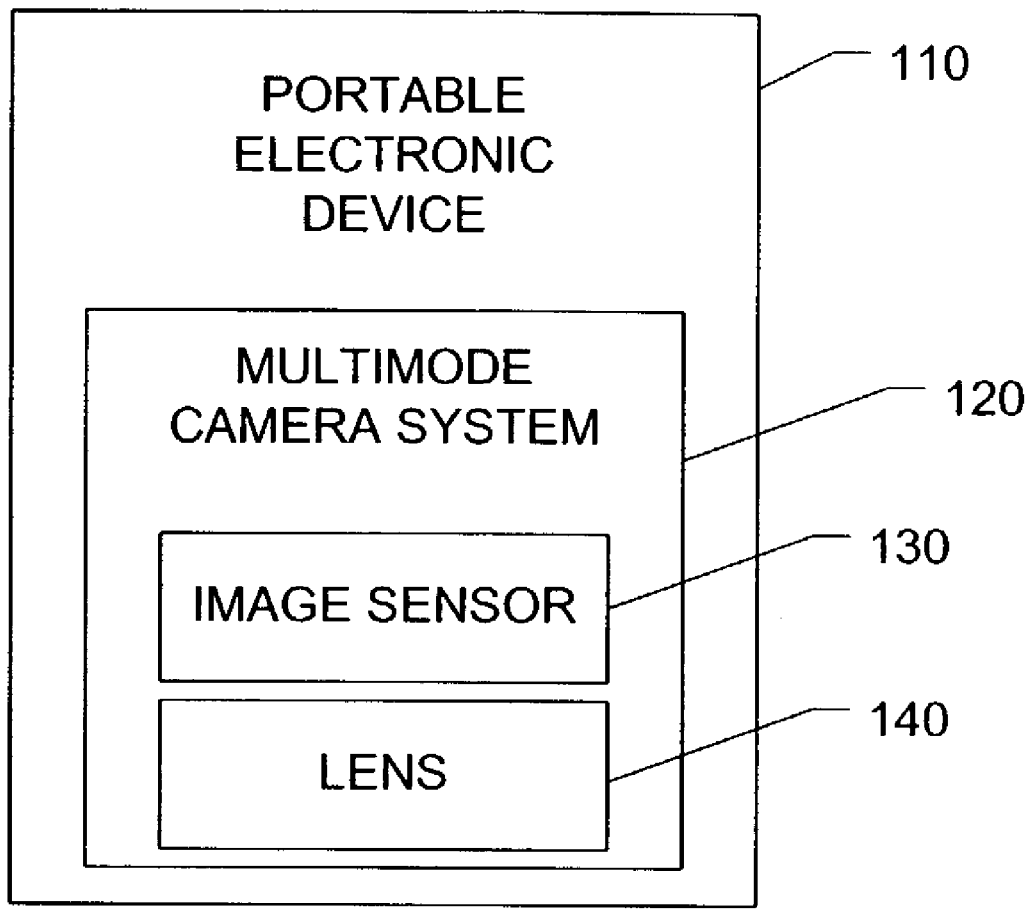
FIG. 1 illustrates a schematic block diagram of a portable electronic device having at least one image sensor in accordance with an aspect of the present invention.

The present invention relates to systems and methods for a multimode portable electronic device employing at least one image sensor. The present invention will now be described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block form in order to facilitate describing the present invention.

Referring initially to FIG. 1, a portable electronic device 110 is depicted in accordance with an aspect of the present invention. The portable electronic device 110 includes a multimode camera system 120. The multimode camera system 120 allows a user to select from a plurality of modes, the plurality of modes having a plurality of focal lengths. The multimode camera system 120 includes at least one image sensor or photosensitive device 130. The image sensor(s) 130 can be a charged-coupled device (CCD), Complementary Metal-Oxide Semiconductor (CMOS), or any other suitable device operable to sense an image. The image sensor(s) 130 reacts to light reflected from the image and translates the strength of the light into electronic signals that are digitized. For example, by passing light through red, green, and blue filters, the intensity of the light can be gauged for each separate color spectrum. When the readings are combined and evaluated via software, the portable electronic device 110 can determine the specific color of each segment of the image. Further, the image is a collection of numeric data such that it can be easily downloaded into a computer and manipulated.

Also included within the portable electronic device 110 is at least one lens 140. The at lens(es) 140 can correspond to a position of the image sensor(s) 130. For example, one image sensor 130 can adapt to a plurality of different positions to correspond with a plurality of lenses 140. If two or more lenses 140 are present, each of the plurality of lenses 140 can have a focal length that is dependent on a shape and other optical characteristics of each lens 140. For instance, the plurality of lenses 140 can be a plurality of different types of lenses. A switch (not shown) can also be included on the portable electronic device 110 for selecting multiple modes of operation for the device 110. Additionally, or alternatively, the portable electronic device 110 can include a plurality of image sensors 130. The plurality of image sensors 130 can have a plurality of different focal lengths; and thus, can correspond with one lens or a plurality of lenses.

The portable electronic device 110 in this example is a hand-held mobile terminal used in a wireless communication network. However, it is to be appreciated that the portable electronic device can also be any other device that is portable in nature and having electronic circuitry therein in accordance with the present invention. For example, the portable device could be a laptop computer or notebook computer, a PDA, or a cellular telephone or pager, or any other wireless device.

Figure 2:
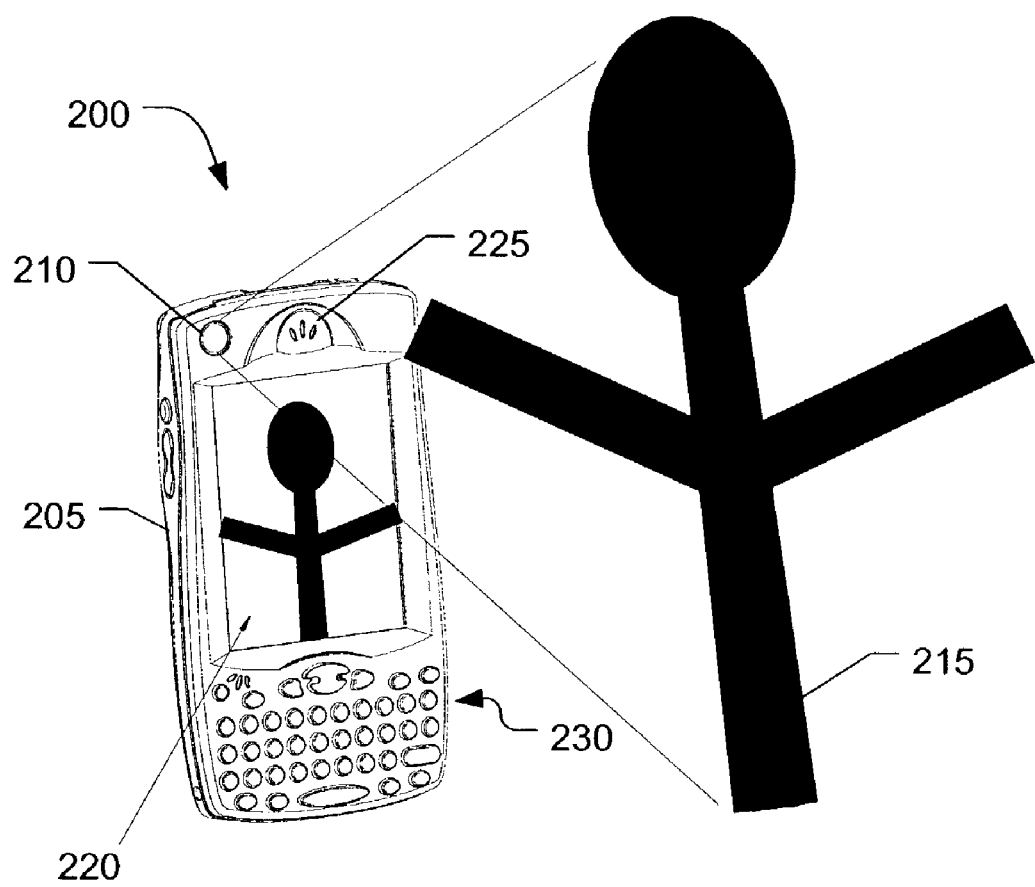
FIG. 2 illustrates a multimode camera system employed in a first mode of operation in accordance with an aspect of the present invention.

FIG. 2 illustrates an example of a front view of a hand-held mobile terminal 200. The mobile terminal 200 comprises a housing 205 having a first lens assembly 210 located on a front side of the housing 205. The first lens assembly 210 includes a first lens and a first window, which can serve to mitigate the entrance of contaminants into the housing 205. Additionally, the window can be a pane of material that is transparent to a selected band of light frequencies and can, thus, serve as an optical filter. The lens is employed to focus an image beam of light onto an image sensor (not shown). The lens has a focal length, such as a wide angle focal length, that is suitable for focusing an image of a user 215 of the mobile terminal 200 onto the image sensor. A typical focal distance for this mode of operation is an arm length such that the user can operate the mobile terminal while holding it in front of him/her. Accordingly, the mobile terminal 200 can be employed for video conferencing. Additionally, or alternatively, the mobile terminal 200 can be employed for user authentication.

Employing the mobile terminal 200 in a video conference mode comprises positioning the image sensor such that it corresponds with the first lens assembly 210. Thus, the image sensor is positioned in a direction of the user 215, which is in substantially the same direction as a display 220 of the mobile terminal 200. When the video conference mode is selected, the image sensor is positioned and optical characteristics, such as focal length, are set up and controlled for the mode. The video conference mode can be activated via a physical switch and/or a speaker in the mobile terminal 200. Software for the video conference mode can be automatically activated upon the positioning of the image sensor. Alternatively, the image sensor can be automatically positioned upon activation of the software for the video conference mode. An image of the user 215 is focused onto the image sensor and transmitted to the mobile terminal display 220 and/or to a remote system for display on a remote computer. The transmitted image can be a static image or live motion video compressed encoded digital signal for presentation in the display screen 220. Additionally, or alternatively, the display 220 can also show a whiteboard-type screen common among video conference participants for jointly communicating text, graphics, or other observable or audible program or data, such as for workgroup or class collaboration to review or discuss draft documents, faxes, or other forms or files.

The video conferencing mode can also be employed for speech recognition. The image sensor can capture visual data generated from a set of markers used to describe lip and mouth movement generated by a given speech utterance. A database can then be employed to provide a correlation between vocalized sounds and the visual data to perform recognition.

Employing a user authentication mode of the mobile terminal 200 comprises verifying or recognizing the identity of the user 215. Verification of the user 215 is a process in which a computer biometric code from the user 215 is compared to a previously stored biometric code to determine whether the user 215 is who he or she claims to be. Recognition of the user 215 is a process in which a computed biometric code from the user 215 is compared to a database of many different biometric codes with the objective of determining the identity of the user 215.

Such biometric codes can include analyzing retinal vascular patterns of a human eye. The iris of the eye generally contains a highly detailed pattern that is unique for each individual. To obtain an image of the eye and derive an iris code, the user 215 can perform a self alignment by looking at a reflected or real time video image of their eye and adjusting the position of their face of the mobile terminal 200 until an aligned, focused image is obtained. Image processing software can be utilized to determined whether the image is aligned and focused and can notify the user with a visual light and/or audible signal when the eye is properly aligned. Alternatively, the mobile terminal 200 can employ a suitable alignment process to acquire a properly aligned image of an iris of the person to be identified. Accordingly, the lens assembly 210 and image sensor are set up and controlled such that an iris code for the user 215 can be obtained by the mobile terminal 200.

Additionally, the mobile terminal 200 can recognize and/or identify the user 215 via a facial recognition system. The system can locate a face in a random video scene, identify the face, and distinguish the recognized individual from other persons by electronically camera scanning facial features and comparison to stored parameters derived from previous scans. For example, a classification tree could be employed which allows for recognition of an input pattern such as image or sound without extra processing such as pre-processing of unprocessed pattern data having high order characteristic variables. A system or method in accordance with the subject invention could conduct hierarchical pre-processing in connection with pre-processing a learning pattern, and prepare the classification tree based on the learning pattern processed by the hierarchical pre-processing and perform recognition in part by employing the classification tree.

Image processing software for the iris recognition mode, the facial recognition mode, or any other suitable user authentication mode can be automatically activated upon the positioning of the image sensor. Alternatively, the image sensor can be automatically positioned upon activation of the user authentication software.

The mobile terminal 200 also includes a set of user interface keys 230. The user interface keys 230 can be employed for allowing the user 215 to input information and/or operational commands. Further, the display 220 can be a touch screen used to display information to the user 215 and may employ capacitive, resistive touch, infrared, surface acoustic wave, or grounded acoustic wave technology. The user interface keys 230 may include a full alphanumeric keypad, function keys, enter keys, etc. The described components are located in the housing 205, which is an elongated enclosure of a suitable size and includes such contours as to conveniently fit into the open palm of the user. A speaker 225 is also included to transmit and/or receive audio information to and from the user. For example, a sound can be emitted from the speaker 225 to alert the user that an image has been successfully scanned and decoded. Additionally, the mobile terminal 200 can include a LED (not shown) that is illuminated to reflect whether the image has been properly or improperly read.

Figure 3:
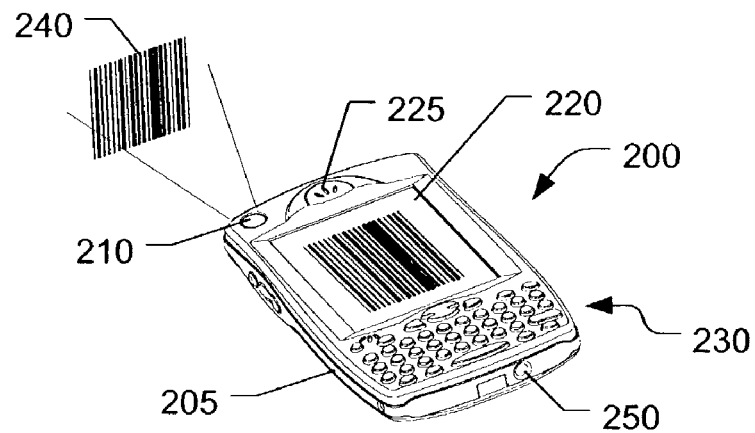
FIG. 3 illustrates a multimode camera system employed in a second mode of operation in accordance with an aspect of the present invention.

FIG. 3 depicts the mobile terminal 200 employing a second lens assembly (not shown) in accordance with an aspect of the present invention. The second lens assembly is comparable to the first lens assembly 210 described with respect to FIG. 2. However, the second lens assembly is located on a top portion of the housing 205 and has different optical characteristics (e.g., focal length) than the first lens assembly 210. The second lens assembly can have a macro focal length for focusing close images. According, the second lens assembly can be employed by the mobile terminal 200 in a bar code scanning mode of operation.

When a bar code scanning mode is selected, the image sensor described with respect to FIG. 2 is positioned such that it corresponds with the second lens assembly. The second lens assembly is operable to focus a target that includes a bar code or other symbol 240 onto the image sensor. The image sensor detects the light reflected or scattered from the target bar code symbol 240. The image sensor is positioned in the mobile terminal 200 along an optical path such that it has a field of view which ensures the capture of a portion of the light reflected or scattered off the targeted bar code symbol 240. This captured portion of reflected light is subsequently detected and converted into an electrical signal. Electronic circuitry or software in the mobile terminal 200 decodes the electrical signal into a digital representation of the data represented by the symbol 240 that has been scanned. For example, the analog electrical signal outputted by the image sensor may be converted into a pulse width modulated digital signal, with widths corresponding to physical widths of the bars and spaces of the bar code symbol 240. Such a digitized signal is then decoded based upon specific symbology, utilized by the symbol 240, into a binary representation of the data encoded in the symbol 240, and subsequently to the corresponding alphanumerical characters. The bar code symbol 240 and/or the decoded information can be transmitted to the display 220 of the mobile terminal 200. Software for the bar code scanning mode can be automatically activated upon the positioning of the image sensor. Alternatively, the image sensor can be automatically positioned upon activation of the software for the bar code scanning mode. The mobile terminal 200 can also include a serial port 250 for connection to a host computer and/or peripheral device, such as a printer.

Figure 4:
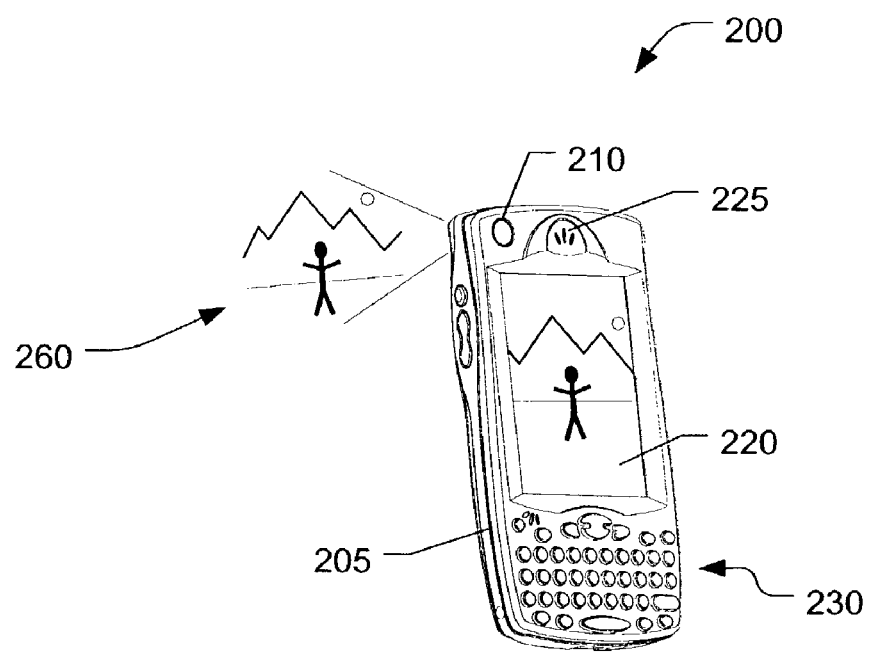
FIG. 4 illustrates a multimode camera system employed in a third mode of operation in accordance with an aspect of the present invention.

Turning now to FIG. 4, the mobile terminal 200 is illustrated as employing a third lens assembly (not shown). The third lens assembly is comparable to the first and second lens assemblies described with herein. However, the third lens assembly is located on a back portion of the housing 205 and has different optical characteristics (e.g., focal length) than both the first and second lens assemblies. The third lens can have an infinite focal length for focusing distant images. Accordingly, the third lens assembly can be employed by the mobile terminal 200 in a digital camera mode of operation.

When a digital camera mode is selected, the image sensor, described with respect to FIGS. 2 and 3, is positioned such that it corresponds with the third lens assembly. The image sensor receives incident light reflected from an object or scene 260 through the third lens assembly. The sensor can typically be implemented as an array of charge coupled device (CCD) or complimentary metal oxide semiconductor (CMOS) photodetecting circuits that create light-generated signals in response to the incident light. Analog signals from the sensor are converted into digital format by an analog-to-digital (A/D) converter and are then further processed by logic circuitry and/or a programmed processor to yield a captured digital image of the object or scene. The image 260 can then be transmitted to the display 220 and/or stored in local memory aboard the mobile terminal 200. In addition, the image 260 can be transferred to a computer that is linked to the mobile terminal 200, for storage as an electronic file and/or for further graphical and image processing to improve the image quality or use with graphics software. Software for the digital camera mode can be automatically activated upon the positioning of the image sensor. Alternatively, the image sensor can be automatically positioned upon activation of the software for the digital camera mode.

Accordingly, the mobile terminal 200 can employ one image sensor and thus, one data processing path for image capture of bar codes, still pictures, video conferencing, facial recognition, iris recognition, and user assisted aligning for iris scanning. It is to be appreciated that other modes of operation can also be realized with the multimode camera system described herein. It is also to be appreciated that a portable electronic device can also comprise more than one image sensor and is contemplated as falling within the scope of the present invention.

Figure 5:
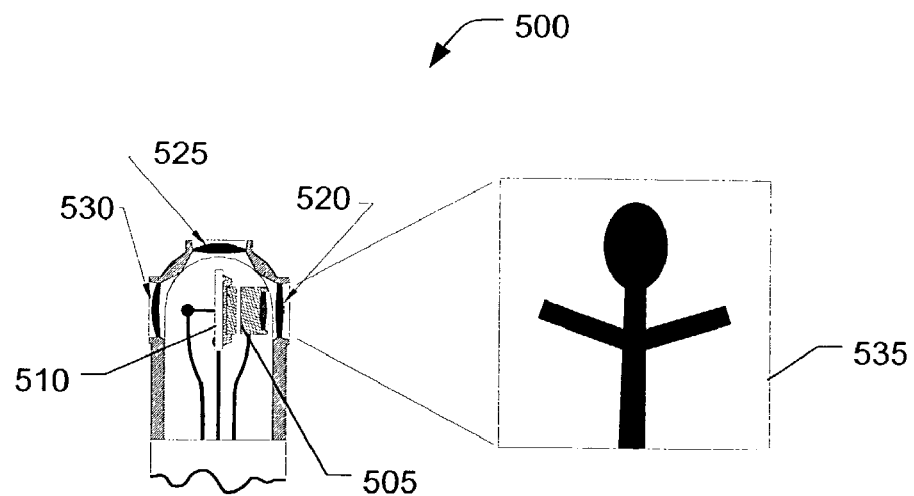
FIG. 5 illustrates an image sensor in a first position in accordance with an aspect of the present invention.
Figure 6:
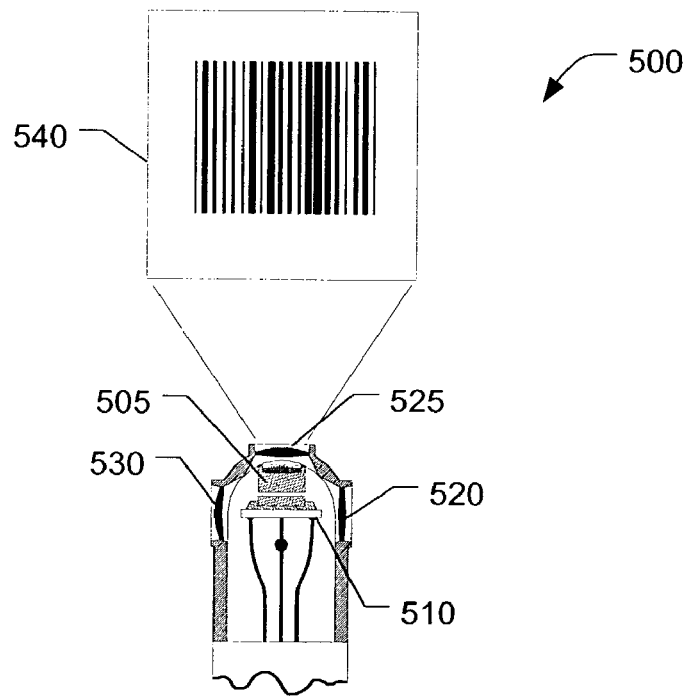
FIG. 6 illustrates an image sensor in a second position in accordance with an aspect of the present invention.
Figure 7:
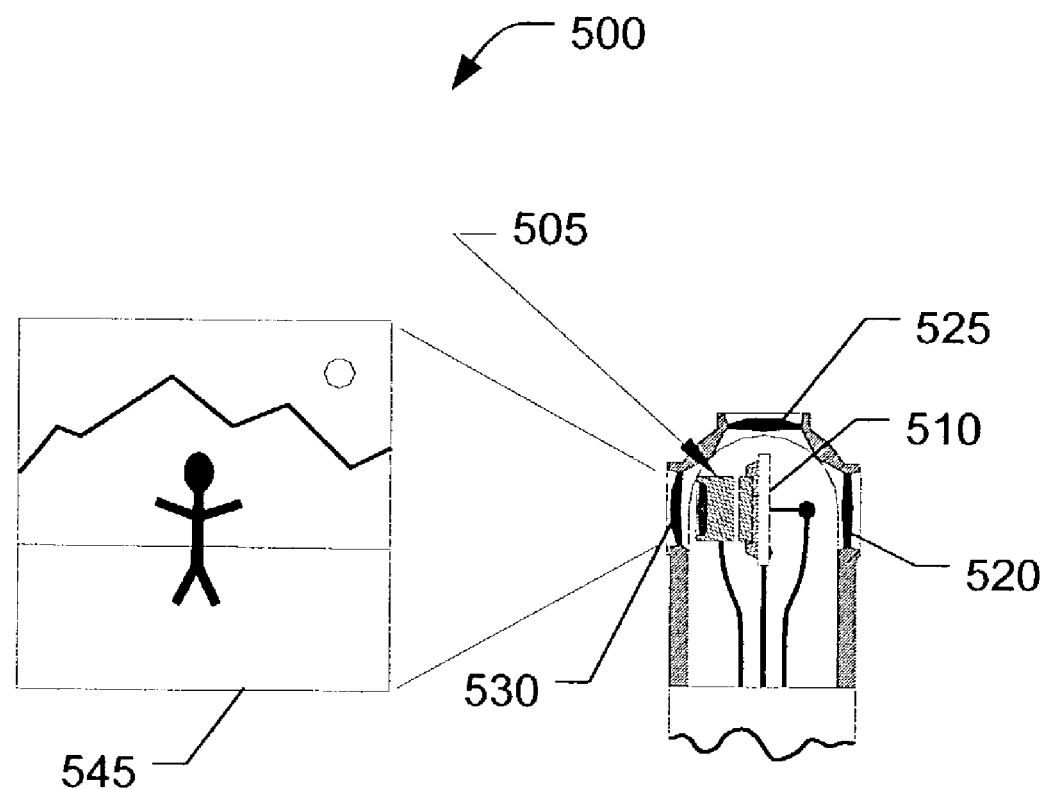
FIG. 7 illustrates an image sensor in a third position in accordance with an aspect of the present invention.

FIGS. 5-7 depict a multimode camera system 500 for a portable electronic device in accordance with an aspect of the present invention. The multimode camera system 500 comprises an image sensor 505 coupled to a support 510. The image sensor 505 and support 510 assembly are repositionable. The image sensor 505 can be charged-coupled device (CCD), Complementary Metal-Oxide Semiconductor (CMOS), or any other suitable device operable to sense an image. The system 500 also includes three lens assemblies 520, 525, and 530. The image sensor 505 can reposition such that the image sensor 505 can correspond with each of the lens assemblies 520, 525, and 530.

Turning now to FIG. 5, the image sensor 505 is positioned in a first position, which can be a video conference or user authentication mode, as described herein. The image sensor 505 positioned in the first position corresponds to a first lens 520, which is configured to focus an image 535 for the selected mode. Turning now to FIG. 6, the image sensor 505 is positioned in a second position, such that the image sensor 505 corresponds to a second lens 525 of a mobile terminal (not shown). The second lens 525 is configured to focus another image 540 for a selected bar code scanning mode, as described with respect to FIG. 3 herein. In FIG. 7, the image sensor 505 is positioned in a third position, which corresponds to a third lens 530. The third lens 530 is configured to focus another image 545 for a digital camera mode, as described herein. A switch on a camera control can detect the selected sensor direction.

Figure 8:
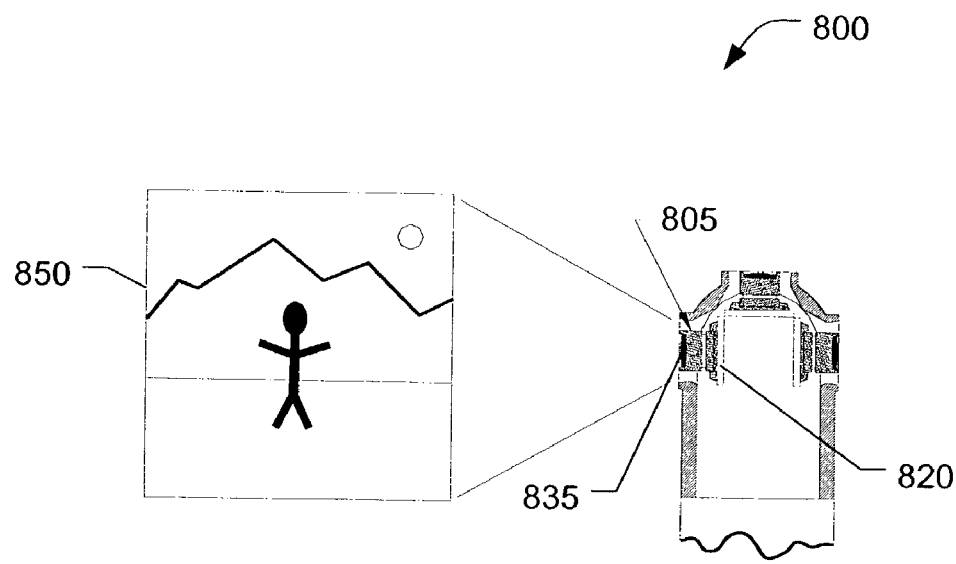
FIG. 8 illustrates a first image sensor and first lens in accordance with an aspect of the present invention.
Figure 9:
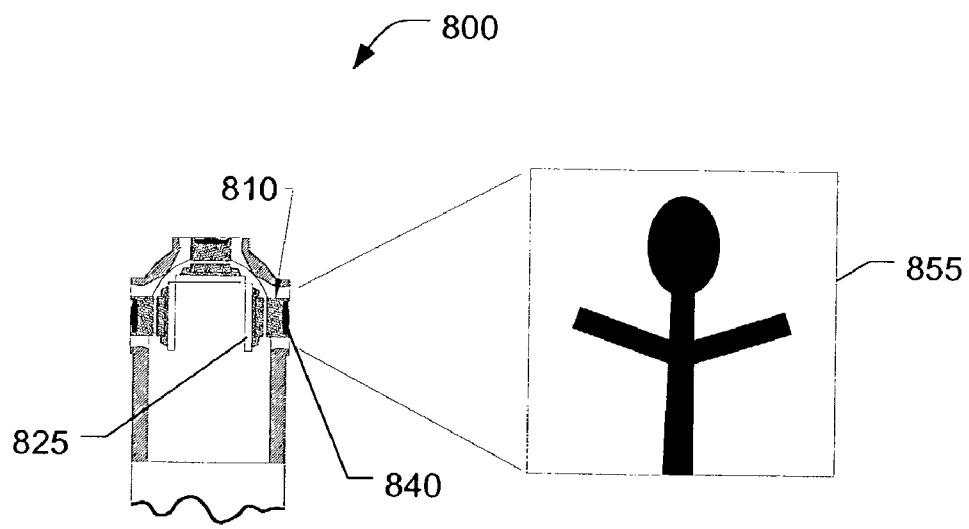
FIG. 9 illustrates a second image sensor and second lens in accordance with an aspect of the present invention.
Figure 10:
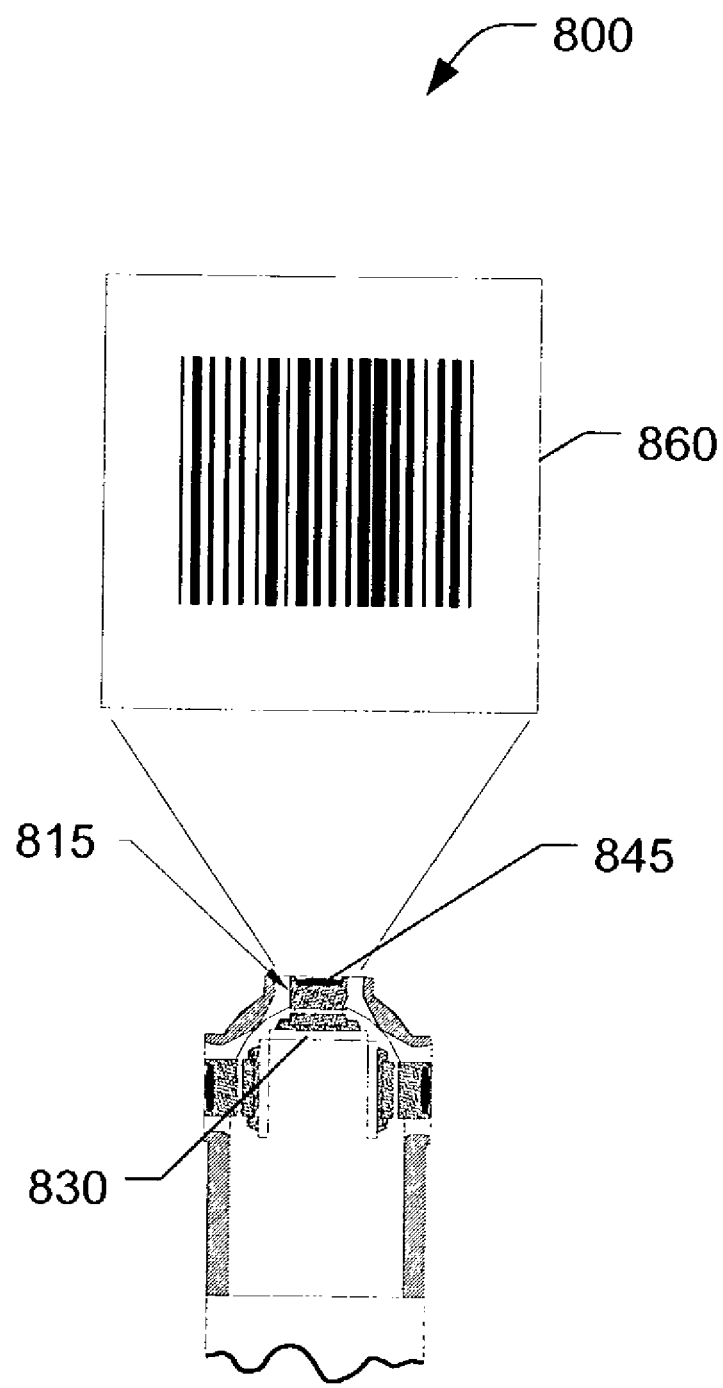
FIG. 10 illustrates a third image sensor and third lens in accordance with an aspect of the present invention.

FIGS. 8-10 illustrate a multimode camera system 800 for a portable electronic device in accordance with another aspect of the invention. The multimode camera system 800 comprises a plurality of image sensors 805, 810, 815 coupled to a plurality of corresponding supports 820, 825, 830. The image sensors 805, 810, 815 and supports 820, 825, 830 each correspond to a different mode of operation for the camera system 800, as will be explained in greater detail below. The image sensors 805, 810, 815 can be charged-coupled devices (CCD), Complementary Metal-Oxide Semiconductors (CMOS), or any other suitable device operable to sense an image. The multimode camera system 800 also includes a plurality of lens assemblies 835, 840, 845, which correspond with the plurality of image sensors 805, 810, 815.

Turning now to FIG. 8, a first image sensor 805 is positioned on a first support 820. The first image sensor 805 and first support 820 can correspond to a digital camera mode, as described herein. The first image sensor 805 corresponds to a first lens 835. The first image sensor 805 and/or the first lens 835 can be adapted to focus an image 850 for the selected mode. For example, the first image sensor 805 can be a distance sensor, which has an infinite focal length for the digital camera mode. Alternatively, or additionally, the first lens 805 can have an infinite focal length for focusing a distant image.

Turning now to FIG. 9, the multimode camera system 800 includes a second image sensor 810 positioned on a second support 825. The second image sensor 810 and second support 825 can correspond to a video conferencing and/or user recognition mode(s), as described herein. The second image sensor 810 corresponds to a second lens 840. The second image sensor 810 and/or the second lens 840 can be adapted to focus an image 855 for the selected mode. For example, the second image sensor 810 can be a wide angle sensor, which has a wide angle focus length for the video conferencing and/or user recognition mode(s). Alternatively, or additionally, the second lens 840 can have a wide angle focal length for focusing an image, which can be approximately an arm's length away.

In FIG. 10, the multimode camera system 800 includes a third image sensor 815 positioned on a third support 830. The third image sensor 815 and third support 830 can corresponds to a bar code scanning mode, as described herein. The third image sensor 815 corresponds to a third lens 845. The third image sensor 815 and/or third lens 845 can be adapted to focus an image 860 for a selected mode of the multimode camera system 800. For example, the third image sensor can be a macro focal length sensor, which has a close-up focus length for the bar-code scanning mode. Alternatively, or additionally, the third lens 845 can have a macro focal length sensor for focusing a close image. A switch on a camera control can detect the selected mode of operation. Alternatively, or additionally, a user can select an application program for a desired mode of operation and the appropriate image sensor is automatically activated.

Although the plurality of multimode camera systems have been described herein as having one only mode of operation corresponding with a different position of the multimode camera system, it is to be appreciated that one position of the camera system can have a plurality of different modes associated therewith. For example, FIGS. 11 and 12 depict multimode camera systems in which at least one image sensor and at least one lens is located at a top position of a portable electronic device.

Figure 11:
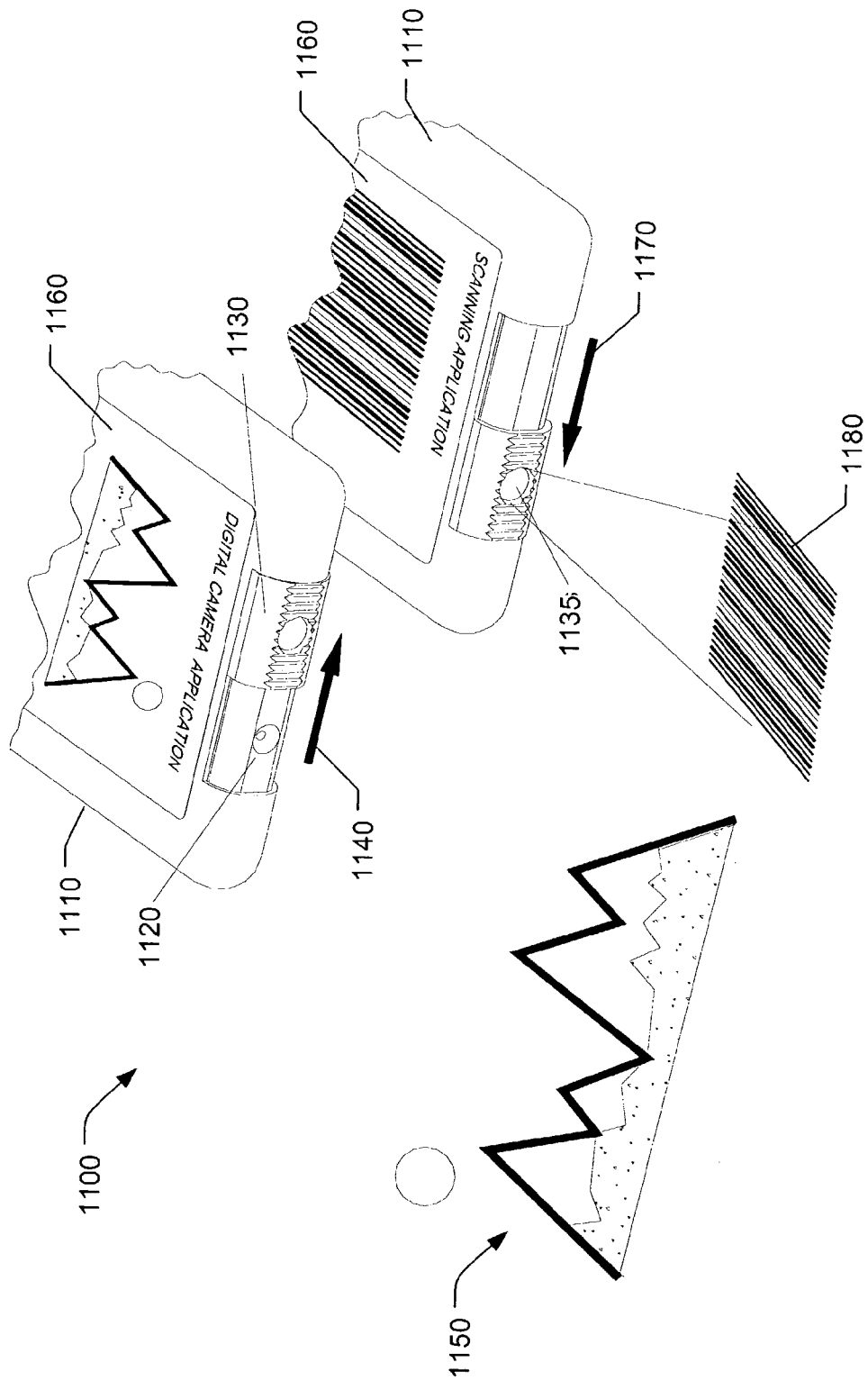
FIG. 11 illustrates a multimode camera system having a repositionable lens in accordance with an aspect of the present invention.

Turning now to FIG. 11, a multimode camera system 1100 having a repositionable lens is illustrated in accordance with an aspect of the present invention. The multimode camera system 1100 includes at least one image sensor (not shown) located within a portable electronic device, or mobile terminal, 1110. A lens 1120 is located in the mobile terminal 1110 such that the mobile terminal 1110 can focus images through the lens 1120 onto the image sensor. It is to be appreciated that lens 1120 may merely include a window with no focal length properties. The mobile terminal 1110 also includes a repositionable lens assembly 1130. The repositionable lens assembly 1130 includes a position mechanism having a lens 1135 positioned therein. When the repositionable lens assembly 1130 is in a position as indicated by arrow 1140, the mobile terminal 1110 can employ a first mode of operation. For example, the first mode of operation can be a digital camera mode and the image sensor and/or lens 1120 can have an infinite focal length to focus distant images 1150. A user can view the image on a display 1160 of the mobile terminal 1110.

A second mode of operation can be employed by moving the repositionable lens assembly 1130 in the direction indicated by arrow 1170. For example, the repositionable lens assembly 1130 can include a macro focal length lens 1135 for close imaging. Accordingly, the repositionable lens assembly 1130 can be employed in a bar code scanning mode of operation. The image 1180 can be displayed on the display 1160 of the mobile terminal. The mobile terminal 1110 can display the image before, during, and/or after the image is captured. The repositioning of the lens assembly 1130 can operatively switch the software application running in the mobile terminal 1110 to correspond with the activated lens and image sensor assembly. The position mechanism illustrated in FIG. 11 employs a sliding mechanism; however, it is to be appreciated that any other suitable mechanism can be employed. For example, a plurality of removable lenses can be positioned over the image sensor window for changing the focal length of the system.

Figure 12:
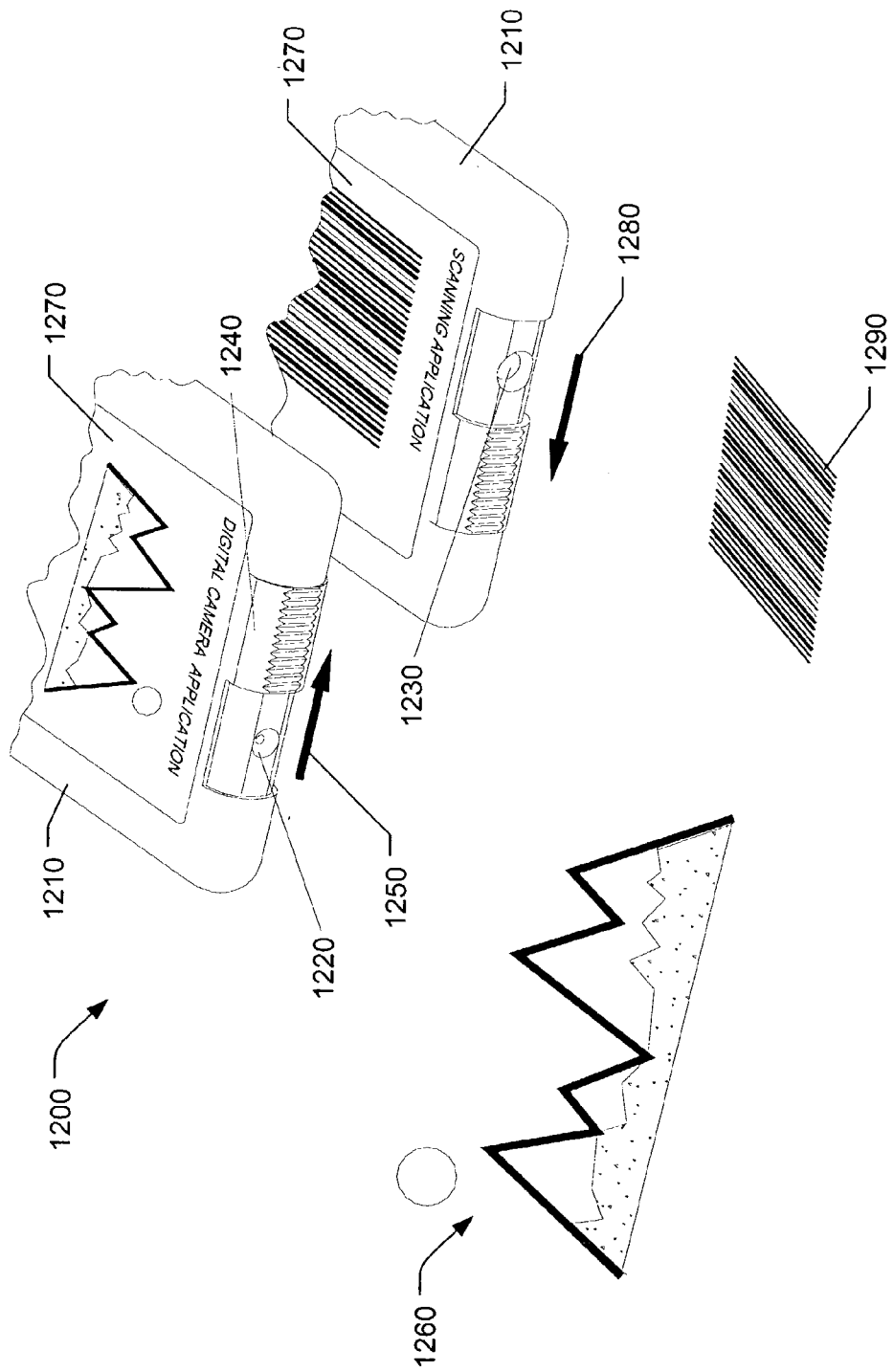
FIG. 12 illustrates a multimode camera system having a repositionable cover in accordance with an aspect of the present invention.

FIG. 12 illustrates a multimode camera system 1200 having a repositionable cover in accordance with as aspect of the present invention. The multimode camera system 1200 includes at least one image sensor (not shown) located within a portable electronic device, or mobile terminal, 1210. A plurality of lenses 1220, 1230 are located in the mobile terminal 1210 such that the mobile terminal 1210 can focus images through the lenses 1220, 1230 onto the image sensor(s). It is to be appreciated that the lenses 1220, 1230 may merely include windows with no focal length properties and the image sensor(s) include the focal length properties instead. The mobile terminal 1210 also includes a repositionable cover 1240. When the repositionable cover 1240 is in a position as indicated by arrow 1250, the mobile terminal 1210 can employ a first mode of operation. For example, the first mode of operation can be a digital camera mode and a first image sensor and/or a first lens 1220 can have an infinite focal length to focus distant images 1260. A user can view the image on a display 1270 of the mobile terminal 1210.

A second mode of operation can be employed by moving the repositionable cover 1240 in the direction indicated by arrow 1280. The repositionable cover 1240 is moved such that it substantially covers the first lens 1220 and image sensor and a second lens 1230 is substantially exposed. The repositionable cover 1240 may also have a position in which no lenses are exposed. When the second lens 1230 is exposed, the mobile terminal 1210 can employ another mode of operation based on the focal length of the second lens 1230 and/or image sensor. For example, the second lens can have a macro focal length for focusing on close images. Accordingly, when the repositionable cover 1240 is positioned in the direction indicated by arrow 1280, a bar code scanning mode of operation can be employed. The image 1290 can be displayed on the display 1270 of the mobile terminal. The mobile terminal 1210 can display the image before, during, and/or after the image is captured. The repositioning of the lens assembly 1240 can operatively switch the software application running in the mobile terminal 1210 to correspond with the activated lens and image sensor assembly. The position mechanism illustrated in FIG. 12 employs a sliding mechanism; however, it is to be appreciated that any other suitable mechanism can be employed.

Figure 13:
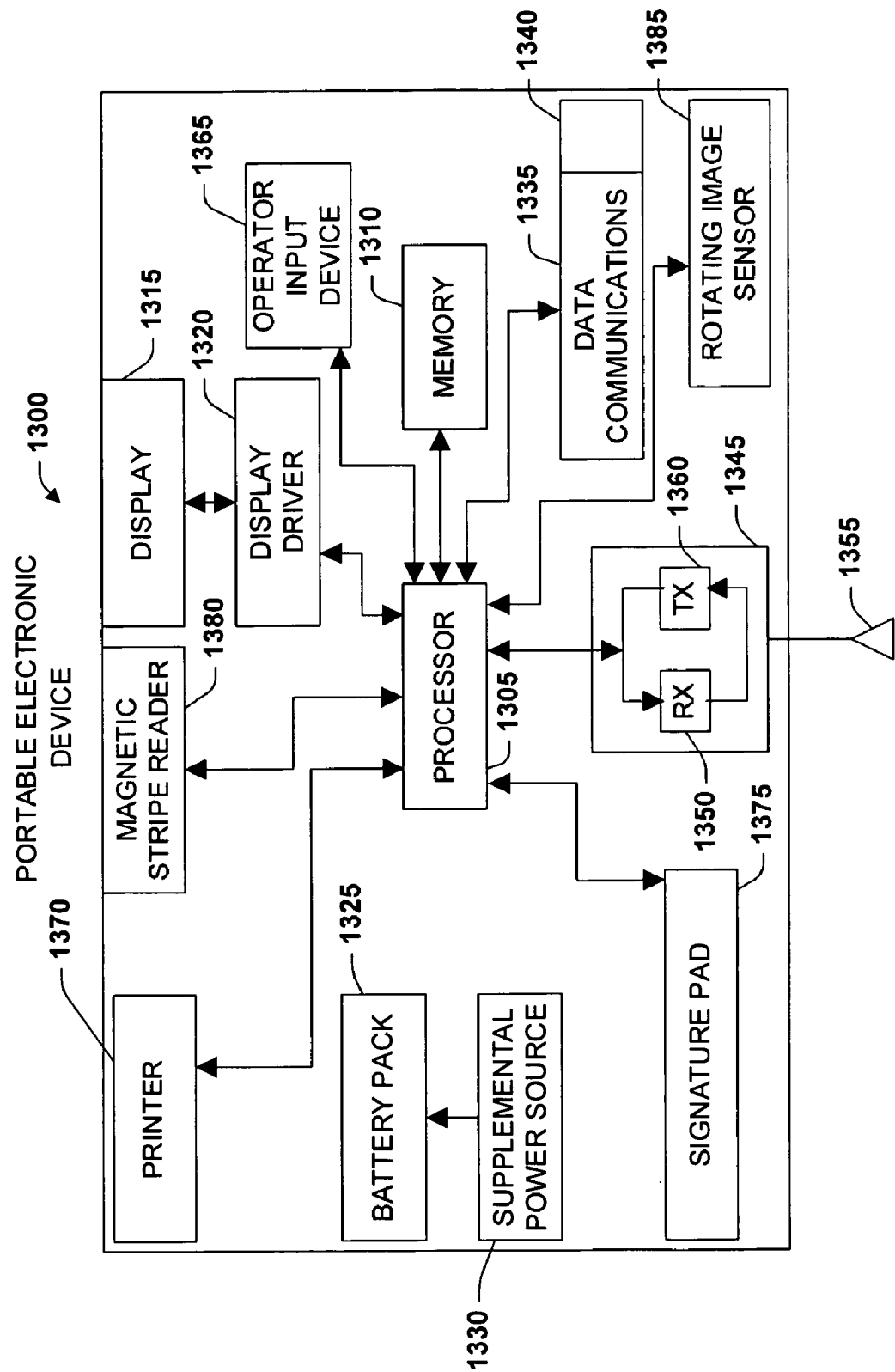
FIG. 13 illustrates a schematic block diagram of a general operation of a portable electronic device in accordance with an aspect of the present invention.

FIG. 13 illustrates a schematic representation according to one aspect of the present invention is shown in which a processor 1305 is responsible for controlling the general operation of a hand-held mobile terminal 1300. The processor 1305 is programmed to control and operate the various components within the mobile terminal 1300 in order to carry out the various functions described herein. The processor or CPU 1305 can be any of a plurality of suitable processors. The manner in which the processor 1305 can be programmed to carry out the functions relating to the present invention will be readily apparent to those having ordinary skill in the art based on the description provided herein.

A memory 1310 tied to the processor 1305 is also included in the hand-held mobile terminal 1300 and serves to store program code executed by the processor 1305 for carrying out operating functions of the hand-held mobile terminal 1300 as described herein. The memory 1310 also serves as a storage medium for temporarily storing information such as receipt transaction information and the like. The memory 1310 is adapted to store a complete set of the information to be displayed. According to one aspect, the memory 1310 has sufficient capacity to store multiple sets of information, and the processor 1305 could include a program for alternating or cycling between various sets of display information.

A display 1315 is coupled to the processor 1305 via a display driver system 1320. The display 1315 may be a liquid crystal display (LCD) or the like. In this example, the display 1315 is a ¼ VGA display with 16 levels of gray scale. The display 1315 functions to display data or other information relating to ordinary operation of the hand-held mobile terminal 1300. For example, the display 1315 may display a set of customer information, which is displayed to the operator and may be transmitted over a system backbone (not shown). Additionally, the display 1315 may display a variety of functions that control the execution of the mobile terminal 1300. The display 1315 is capable of displaying both alphanumeric and graphical characters. Power is provided to the processor 1305 and other components forming the hand-held mobile terminal 1300 by a battery 1325. In the event that the battery 1325 fails or becomes disconnected from the mobile terminal 1300, a supplemental power source 1330 can be employed to provide power to the processor 1305. The mobile terminal 1300 may enter a minimum current draw of sleep mode upon detection of a battery failure.

The mobile terminal 1300 includes a communication subsystem 1335 that includes a data communication port 1340, which is employed to interface the processor 1305 with the main computer. The mobile terminal 1300 also optionally includes an RF section 1345 connected to the processor 1305. The RF section 1345 includes an RF receiver 1350, which receives RF transmissions from the main computer for example via an antenna 1355 and demodulates the signal to obtain digital information modulated therein. The RF section 1345 also includes an RF transmitter 1360 for transmitting information to the main computer, for example, in response to an operator input at a operator input device 1365 (e.g., keypad) or the completion of a transaction. Peripheral devices, such as a printer 1370, signature pad 1375, magnetic stripe reader 1380 can also be coupled to the mobile terminal 1300 through the processor 1305.

Figure 14:
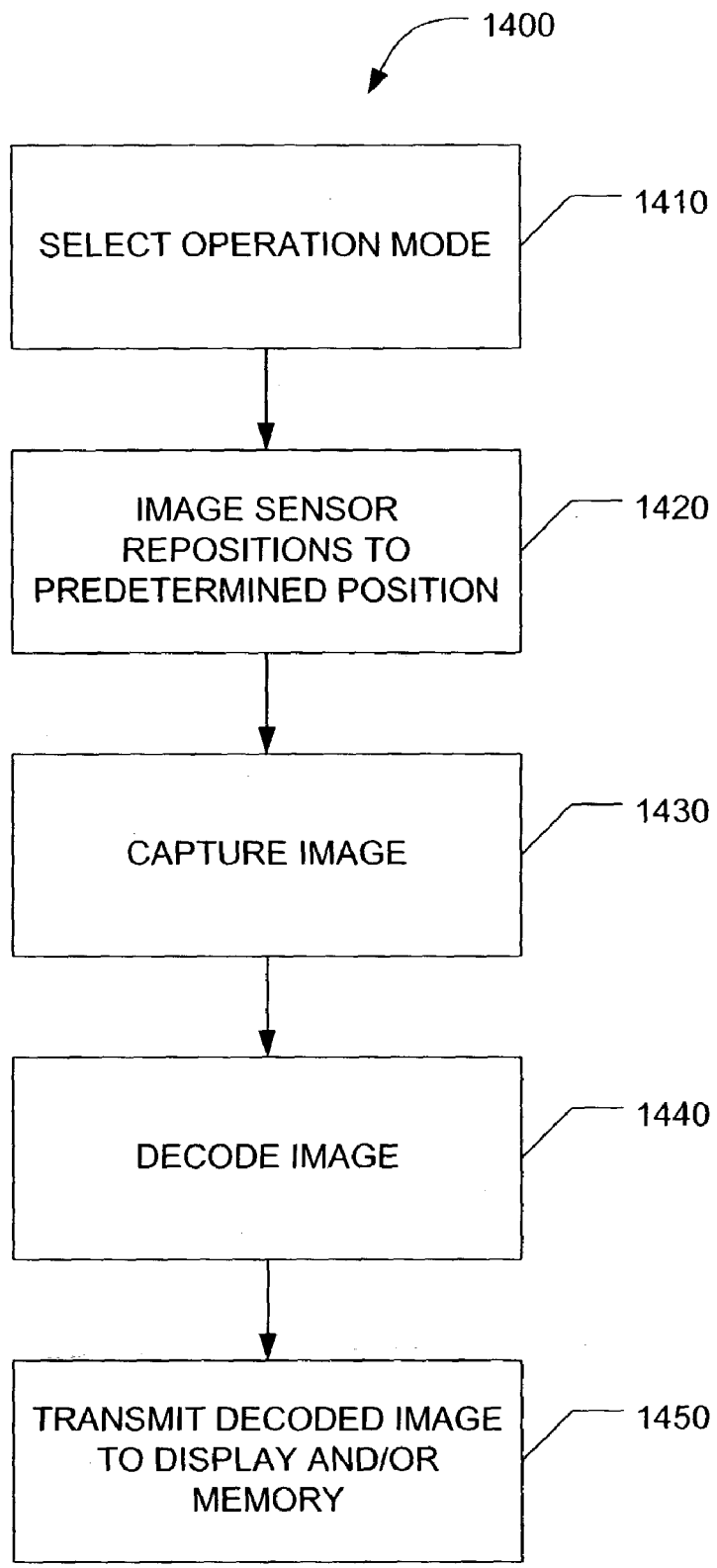
FIG. 14 illustrates a methodology for employing a multimode camera system in accordance with an aspect of the present invention.
Figure 15:
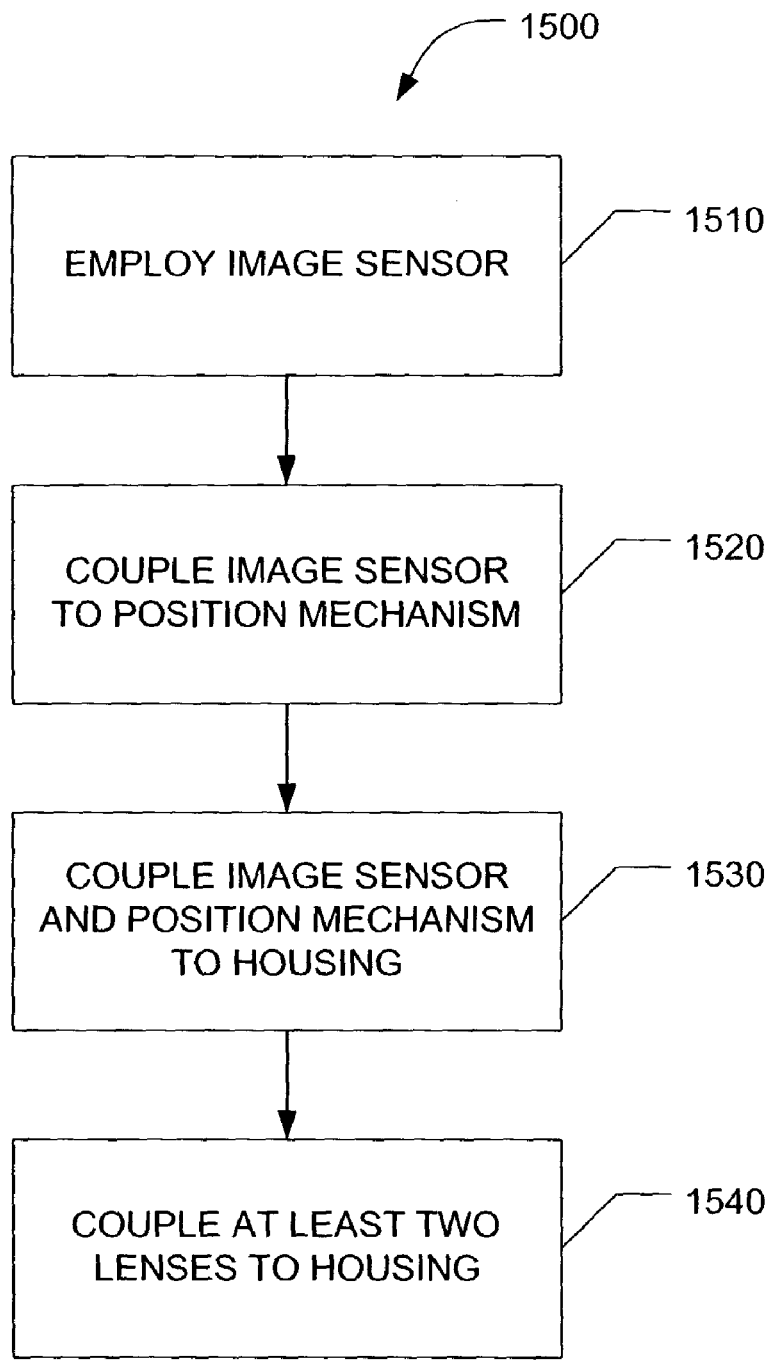
FIG. 15 illustrates a methodology for fabricating a multimode camera system in accordance with an aspect of the present invention.

In view of the foregoing structural and functional features described above, methodologies in accordance with various aspects of the present invention will be better appreciated with reference to FIGS. 14-15. While, for purposes of simplicity of explanation, the methodologies of FIGS. 14-15 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

FIG. 14 illustrates a methodology 1400 for utilizing a multimode camera system in accordance with an aspect of the present invention. The methodology begins at 1410 where an operation mode for the camera system is selected. The operation mode can be a mode for image capture of bar codes, still pictures, video conferencing, facial recognition, iris recognition, user assisted aligning for iris scanning, or any other mode desired by a user. Then, at 1420, an image sensor repositions to a predetermined position, depending upon the mode selected. The image sensor may be of any type suitable for the application at hand. The image sensor is positioned such that the image sensor is aligned with a lens, which is configured for the mode of operation selected. At 1430, the camera system captures the image by focusing the image through the lens onto the image sensor. The image sensor decodes the image at 1440 by an analog to digital converter, for example. Then, at 1450, the decoded image is transmitted to a display of the camera system and/or a memory of the camera system or other electronic device connected to the camera system.

FIG. 15 illustrates a methodology 1500 for fabricating a multimode camera system. The methodology begins at 1510 where an image sensor is employed. The image sensor can be charged-coupled device (CCD), Complementary Metal-Oxide Semiconductor (CMOS), or any other suitable device operable to sense an image. At 1520, the image sensor is coupled to positioning mechanism, such that the image sensor is adaptable to a plurality of positions. Then, at 1530, the image sensor and positioning mechanism is coupled to a camera housing. At 1540, at least two lenses are also coupled to the housing. The image sensor is operable to reposition to at least two different positions within the housing which correspond to the at least two lenses.

Figure 16:
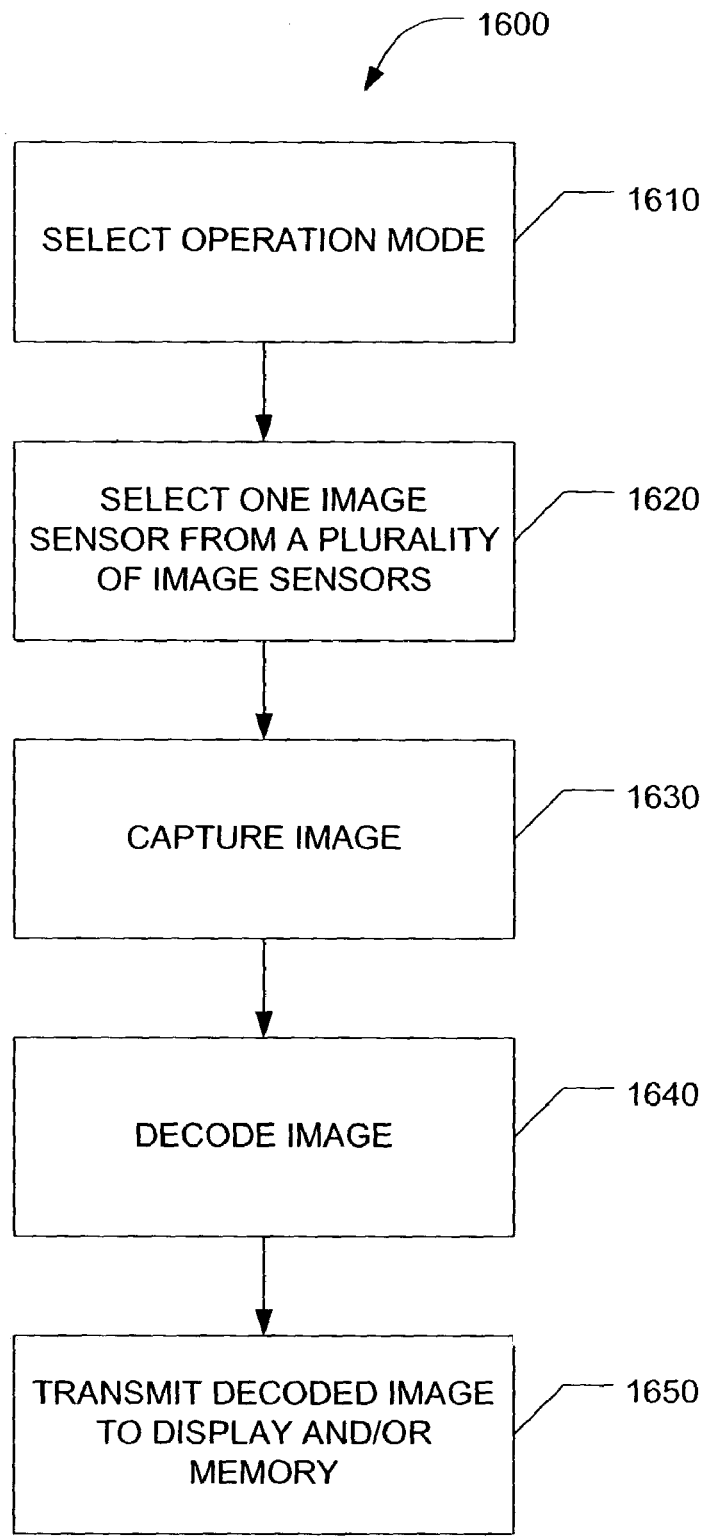
FIG. 16 illustrates a methodology for utilizing a multimode camera system in accordance with an aspect of the present invention.

FIG. 16 illustrates another methodology 1600 for utilizing a multimode camera system in accordance with an aspect of the present invention. The methodology begins at 1610 where an operation mode for the camera system is selected. The operation mode can be a mode for image capture of bar codes, still pictures, video conferencing, facial recognition, iris recognition, user assisted aligning for iris scanning, or any other mode desired by a user. Then, at 1620, one of a plurality of image sensors is selected depending upon the mode selected. The image sensor may be of any type suitable for the application at hand. A lens corresponds with the selected image sensor. The lens and/or the image sensor has a focal length corresponding with the selected mode of operation. At 1630, the camera system captures the image by focusing the image through the lens onto the image sensor. The image sensor decodes the image at 1640 by an analog to digital converter, for example. Then, at 1650, the decoded image is transmitted to a display of the camera system and/or a memory of the camera system or other electronic device connected to the camera system.

Figure 17:
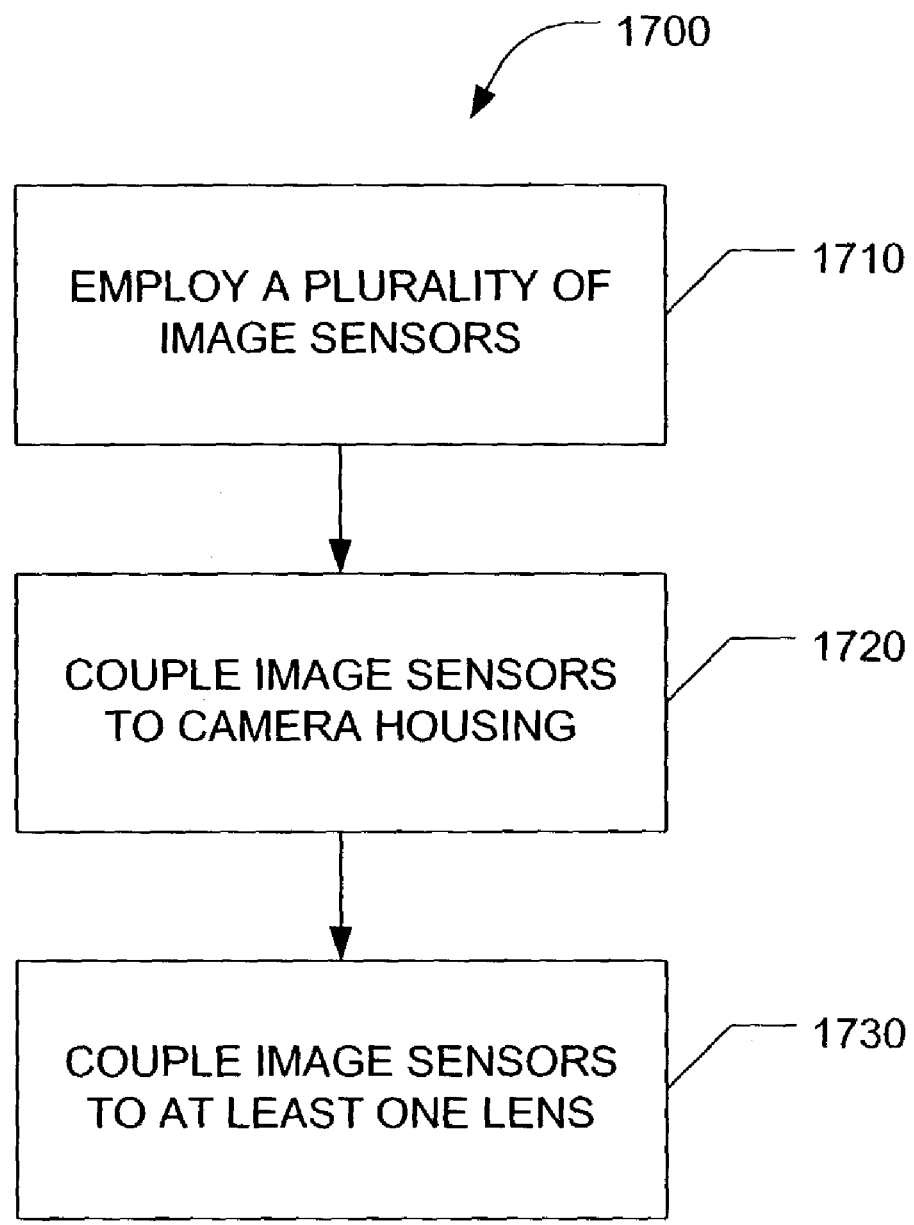
FIG. 17 illustrates a methodology for fabricating a multimode camera system in accordance with an aspect of the present invention.

FIG. 17 illustrates another methodology 1700 for fabricating a multimode camera system. The methodology begins at 1710 where a plurality of image sensors are employed. The image sensors can be charged-coupled devices (CCD), Complementary Metal-Oxide Semiconductors (CMOS), and/or any other suitable device operable to sense an image. At 1720, the image sensors are coupled to a camera housing. At 1730, at least one lens is also coupled to the housing. There can be one lens that can reposition to correspond with an active image sensor. Alternatively, or additionally, there can be a plurality of lenses, such that each lens corresponds to a different image sensor.

It is to be appreciated that the multimode camera system of the subject invention as described herein has wide applicability. The multimode camera system can be employed for example in numerous types of commercial and industrial electronic devices (e.g., cellular telephones, computers, personal data assistants, cameras, toys, electronic games . . . ). Moreover, the methodologies of the subject invention can be employed in connection with processes associated with fabricating camera systems related to such devices. It is also to be appreciated that the scope of the present invention is intended to include any portable electronic device and the type of image sensor and/or lens it is employing.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A multimode camera system, comprising:
   a housing;
   at least three lenses each of varying focal length located at disparate locations within the housing;
   an image sensor located within the housing, wherein the image sensor is repositionable between each of the at least three lenses;
   a control component that aligns the sensor with a suitable one of the at least three lenses based at least in part on a selected mode of operation;
   a repositionable cover that covers one of the at least three lenses, the removal of the repositionable cover activates a mode of operation;
   a first lens corresponding to a first position of the image sensor;
   a second lens corresponding to a second position of the image sensor; and
   at least one of the first lens and the first position of the image sensor being configured for a user recognition mode.

2. The multimode camera system of claim 1, at least one of the first lens and the first position of the image sensor being configured for a video conferencing mode.

3. The multimode camera system of claim 1, at least one of the second lens and the second position of the image sensor being configured for a bar code scanning mode.

4. The multimode camera system of claim 1, further comprising a third lens corresponding to a third position of the image sensor.

5. The multimode camera system of claim 4, at least one of the third lens and the third position of the image sensor being configured for a digital camera mode.

6. The multimode camera system of claim 1, further comprising a switch to detect an operation mode of the camera system.

7. The multimode camera system of claim 1, further comprising a display for displaying an image captured by the camera system.

8. The multimode camera system of claim 1, further comprising a speaker for providing audible signals to a user.

9. The multimode camera system of claim 1, further comprising a serial port for connecting the camera system to at least one of a host computer and a peripheral device.

10. The multimode camera system of claim 1, wherein the repositioning of the image sensor launches a corresponding software application.

11. The multimode camera system of claim 1, the image sensor being a charged-coupled device (CCD).

12. The multimode camera system of claim 1, the image sensor being a Complementary Metal-Oxide Semiconductor (CMOS).

13. The multimode camera system of claim 1 being a mobile terminal.

14. The multimode camera system of claim 1 being a personal digital assistant (PDA).

15. The multimode camera system of claim 1 being a cellular telephone.

16. The multimode camera system of claim 1 being a wireless device.

* * * * *